UNITED STATES PATENT OFFICE.

GEORGE W. SCOLLAY, OF NEW YORK, N. Y.

ART OF MAKING PAINT.

SPECIFICATION forming part of Letters Patent No. 446,019, dated February 10, 1891.

Application filed February 7, 1890. Serial No. 339,603. (No specimens.)

*To all whom it may concern:*

Be it known that I, GEORGE W. SCOLLAY, a citizen of the United States, residing in the city, county, and State of New York, have invented certain new and useful Improvements in the Art of Making Paint, of which the following is a specification.

My present invention consists of certain improved methods of making or improving paint or pigment which will be severally pointed out in the claims concluding this specification.

For the purpose of enabling those skilled in the art to which my invention relates or with which it is most nearly connected to understand its nature and to use it in a practical form and in the way in which I now prefer to practice it I will proceed to describe how my invention may be carried into effect. It will, however, be understood that my invention is not limited to the precise methods described by me herein, or to the employment of the exact materials described, since various modifications and changes may be made and various equivalents may be employed without departing from its spirit and without exceeding the scope of the concluding claims.

In an application for a patent filed by me on February 1, 1890, I have described a novel method of treating paint or paint stock made from the soap stock removed from vegetable oil during the process of refining. The improved paint or paint stock thus made forms an excellent material with which to treat pigment according to the principles of my present invention. As is more fully described in my said pending application, (to which reference is here made for a fuller description thereof,) in order to make this paint stock or color or filling material from soap stock I add to such stock a metallic salt. This converts the soap stock into a paint or paint stock, which forms an excellent filler, for the purposes hereinafter described. This is also described in my patent, No. 396,432, dated January 22, 1889. To make this paint into a paint of superior color, I treat it with an acid, either in the form of an acid or in the form of a salt (as arsenious acid or bichromate of potassium or sodium or sodium ferro-cyanide,) subsequently washing or removing the solubles, and where a superior color is desired this is the filler which I prefer to employ. By the use of this last-named filling material I not only satisfy to a certain extent the absorbing property of the pigment, but at the same time I produce a pigment of superior color and of increased value on that account.

Cotton-seed oil is not a good drying oil; but when it has been subjected to treatment with an alkali to form soap stock and the soap stock has been treated with a metallic salt to form paint stock it is made an excellent drier and may be used for the same purpose as ordinary driers. Instead of using such a filler, I may employ some other filler which has not all these desirable or advantageous qualities, and which will still have the function of satisfying more or less the absorbing properties of the pigment. If this filling material be cheaper than linseed-oil, an economy will result, because pigments—such as ocher, for example—require a certain amount of oil—such as linseed-oil, for example—to be mixed with them in order to form a paint paste or fluid. If, therefore, the absorbing properties of the pigment be satisfied to a greater or less degree, it will require the addition of only a smaller quantity of oil to make it into a paint paste or fluid. Ocher treated in the manner hereinafter described by me requires only about one-half of the quantity of oil to wet it up that it requires before said treatment. Any suitable oil or oleaginous matter, paint stock, gum, resin, and insoluble soap or plaster, or any substance which is capable of being used to fill the pores of the pigment or to satisfy partially or wholly its absorbent properties may be employed for this purpose. Some of these filling materials dry very slowly; but when a filler which is not a good drier—such as cotton-seed oil, for example—has been finely subdivided by entry into a pigment, as ocher, it oxidizes more rapidly; but no matter how slowly it dries if the ocher and oil be permitted to thoroughly dry before it is mixed with a drying-oil, as linseed-oil, the resulting paint when applied will dry with substantially the same rapidity as if only linseed-oil were used with the ocher. This results from the fact that poorer drying-oil is mixed with the pigment first and dried before the better drying-oil is added.

If oil or oleaginous matter neither treated with an alkali and metallic salt nor dried before the drying-oil is added be used, a sticky and slow-drying paint will result.

Oils, oleaginous matter, paint stock, gum, resin, and plaster are not in a condition in which they can be readily combined with the ocher to permeate and fill its pores, and I therefore prefer to treat these materials with a suitable solvent or solvents, by which they are rendered fluid enough to enter and fill the pores of the pigment.

Take, for example of the working of my invention, a given quantity of ocher and mix with it, say, twenty per cent., in weight, of the paint or paint stock above referred to and, say, ten per cent. of naphtha. Then agitate the mixture while it is subjected to heat. The naphtha will dissolve the paint stock and enable it to readily penetrate and saturate the ocher. The effect of the heat will be to volatilize the naphtha and drive it off. After this has been driven off by distillation the substance remaining will be such matter as is not volatile at the temperature employed—that is, ocher, oil, and color—in a dry and powdered condition, or which will readily dry when further exposed to air or oxidation, the oil and ocher being distributed throughout the mass or continued in the pores of the ocher, and, in the example under consideration, constituting twenty per cent. of the weight of the resultant pigment. At the same time the pigment is improved in color and brightness or luster, and is for that reason per pound more valuable than the ocher before treatment. Furthermore, its value is increased because the absorbent properties of the pigment have been to a certain degree satisfied, and therefore a given quantity of linseed-oil will wet up into a paste about twice as much of this ocher as of the untreated ocher, and the gloss, elasticity, and drying qualities of the resulting paint are improved. Pigment thus prepared will improve rather than deteriorate with age, and it may be kept an indefinite time before the additional oil required to make of it a paste or fluid is added. This operation may be conducted in a suitable jacketed cylindrical vessel containing paddles suitable for agitating the mixture and provided with means for maintaining uniform heat throughout the mass sufficient to volatilize the naphtha, which is then conducted from the covered air-tight vessel through a pipe terminating in a worm surrounded by cold water to condense the naphtha, after which it is received into a suitable vessel and can be used again and again. In this way it will be seen that I effect a saving of the linseed-oil it would require to fill the pores of the pigment without reducing the adhesiveness or durability of the paint by the substitution of a less costly filler which at the same time enhances the value of the pigment by making it a better drier by adding color and rendering it capable of being made into a paint-paste with the addition of one-half the linseed-oil necessary to accomplish the object without my treatment.

The proportions stated are quite arbitrary. Generally speaking, it is advantageous to add to the ocher as much paint stock as it will readily absorb and take up in the form of a dry powder, as this is the form in which I prefer to make it; but less or even more may be used, if desired. Besides, the absorbing capacities of various pigments differ and the amount of filling which may be employed to obtain given results correspondingly vary.

Not only ocher, but white lead or any suitable pigment may be subjected to treatment as above described or to any equivalent treatment with a filler to obtain substantially the same results.

The object of employing naphtha in the process above described is to finely divide the oil and color and make it into a thinner fluid which will more readily penetrate into the pores and interstices of the ocher. Its office is therefore mechanical, carrying the oil into the interstices of the ocher. Instead of naphtha, other solvents may therefore be employed, or any material which will have the same function.

For an example of the manner in which my present invention may be carried out by the use of some other material as a filler than the pigment or color hereinbefore described, take ocher mixed with enough crude or refined cotton-seed oil or other suitable oil to satisfy more or less its absorbent qualities. It is then thoroughly dried. In this operation a solvent may or may not be employed. It is then in condition to be mixed with linseed-oil. In this way a paint containing a portion of cotton-seed oil will be made which will dry rapidly and which is elastic yet hard after drying.

The examples which I have given, read in connection with these explanations, will indicate to any skilled person the nature of the several elements of my present invention. I do not claim in this patent the method of making paint consisting of treating with an acid a pigment formed by the combination of a metallic base with the residuum of vegetable oil, as that forms in part the subject-matter of my said pending application.

Having thus described the nature of my invention, what I claim, and desire to secure by Letters Patent, is—

1. The method of making an improved paint, which consists of treating vegetable oil with alkali and a metallic salt and an acid to form fluid paint, and of subsequently mixing said fluid paint with a solvent and a pigment, and of subsequently removing said solvent and drying said pigment and filler, and subsequently adding oil to dry after the paint is applied.

2. The method of making an improved paint, which consists of treating vegetable oil with alkali and a metallic salt to form paint, then mixing said paint with a pigment, then drying said mixture, then making a fluid paint by adding oil thereto to dry after the paint is applied.

3. The method of making an improved paint, which consists of treating vegetable oil with an alkali and a metallic salt and an acid to form paint, then mixing said paint with a pigment, then drying said mixture, then making a fluid paint by adding oil thereto to dry after the paint is applied.

4. The method of making an improved paint, which consists of mixing with a suitable pigment a filling material and a solvent of said filling material, and of subsequently removing said solvent.

5. The method of making an improved dry paint, which consists of mixing with a suitable pigment a filling material and a solvent of said filling material, and subsequently removing said solvent and drying said pigment and filling material.

6. The method of making an improved paint, which consists of mixing with a suitable pigment a filling material and a solvent of said filling material more volatile than said filling material, and then removing said solvent by distillation.

7. The method of making an improved paint, which consists of mixing with a suitable pigment a fluid filling material, then drying said pigment and filler, and then making a fluid paint by adding oil thereto to dry after the paint is applied.

8. The method of making a dry paint stock or pigment from which a fluid paint may be made by grinding with oil, which consists of mixing with a pigment fluid filling material in quantities not substantially in excess of the absorbing capacity of the pigment and then drying said mixture.

GEO. W. SCOLLAY.

Witnesses:
J. EDGAR BULL,
R. A. CORMALDI.